US009147078B2

(12) United States Patent  
Muff et al.

(10) Patent No.: US 9,147,078 B2  
(45) Date of Patent: *Sep. 29, 2015

(54) INSTRUCTION SET ARCHITECTURE WITH SECURE CLEAR INSTRUCTIONS FOR PROTECTING PROCESSING UNIT ARCHITECTED STATE INFORMATION

(71) Applicant: International Business Machines Corporation, Armonk, NY (US)

(72) Inventors: Adam J. Muff, Issaquah, WA (US); Paul E. Schardt, Rochester, MN (US); Robert A. Shearer, Woodinville, WA (US); Matthew R. Tubbs, Issaquah, WA (US)

(73) Assignee: International Business Machines Corporation, Armonk, NY (US)

( * ) Notice: Subject to any disclaimer, the term of this patent is extended or adjusted under 35 U.S.C. 154(b) by 69 days.

This patent is subject to a terminal disclaimer.

(21) Appl. No.: 13/795,486

(22) Filed: Mar. 12, 2013

(65) Prior Publication Data

US 2014/0229690 A1 Aug. 14, 2014

Related U.S. Application Data

(63) Continuation of application No. 13/767,650, filed on Feb. 14, 2013.

(51) Int. Cl.

| | |
|---|---|
| *G06F 7/04* | (2006.01) |
| *G06F 12/00* | (2006.01) |
| *G06F 12/14* | (2006.01) |
| *G06F 13/00* | (2006.01) |
| *G06F 17/30* | (2006.01) |
| *G11C 7/00* | (2006.01) |
| *G06F 21/60* | (2013.01) |
| *G06F 9/455* | (2006.01) |

(Continued)

(52) U.S. Cl.  
CPC ............ *G06F 21/60* (2013.01); *G06F 9/45533* (2013.01); *G06F 9/45558* (2013.01); *G06F 12/1475* (2013.01); *G06F 21/53* (2013.01); *G06F 21/556* (2013.01); *G06F 2009/45587* (2013.01); *G06F 2221/2143* (2013.01)

(58) Field of Classification Search  
CPC .................................. G06F 9/00; G06F 21/60  
USPC .................................... 712/221, 227; 726/34  
See application file for complete search history.

(56) References Cited

U.S. PATENT DOCUMENTS 5,029,070 A * 7/1991 McCarthy et al. ............ 711/143  
7,971,018 B2 6/2011 Schwemmlein (Continued)

OTHER PUBLICATIONS

Jin et al., "Secure MMU: Architectural Support for Memory Isolation among Virtual Machines," Appears in the 7th Workshop on Hot Topics in System Dependability (HotDep'11), 2011, pp. 1-6.

*Primary Examiner* — Thanhnga B Truong  
*Assistant Examiner* — Khalil Naghdali  
(74) *Attorney, Agent, or Firm* — Middleton Reutlinger

(57) ABSTRACT

A method and circuit arrangement utilize secure clear instructions defined in an instruction set architecture (ISA) for a processing unit to clear, overwrite or otherwise restrict unauthorized access to the internal architected state of the processing unit in association with context switch operations. The secure clear instructions are executable by a hypervisor, operating system, or other supervisory program code in connection with a context switch operation, and the processing unit includes security logic that is responsive to such instructions to restrict access by an operating system or process associated with an incoming context to architected state information associated with an operating system or process associated with an outgoing context.

12 Claims, 6 Drawing Sheets

(51) Int. Cl.
*G06F 21/53* (2013.01)
*G06F 21/55* (2013.01)

(56) References Cited

U.S. PATENT DOCUMENTS

| | | | |
|---|---|---|---|
| 8,042,157 B2* | 10/2011 | Bennett et al. | 726/4 |
| 8,407,761 B2* | 3/2013 | Carter et al. | 726/2 |
| 2005/0149701 A1* | 7/2005 | Chen et al. | 712/221 |
| 2007/0180271 A1* | 8/2007 | Hatakeyama et al. | 713/193 |
| 2008/0072023 A1* | 3/2008 | Li | 712/225 |
| 2008/0282345 A1 | 11/2008 | Beals | |
| 2009/0055693 A1* | 2/2009 | Budko et al. | 714/57 |
| 2011/0173409 A1* | 7/2011 | Sibert | 711/163 |
| 2012/0079254 A1* | 3/2012 | Williams et al. | 712/227 |
| 2013/0145051 A1* | 6/2013 | Kegel et al. | 710/9 |
| 2013/0339953 A1* | 12/2013 | Wibling et al. | 718/1 |
| 2014/0337637 A1* | 11/2014 | Kiperberg et al. | 713/189 |

* cited by examiner

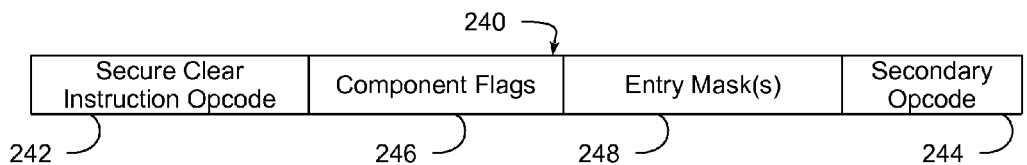
FIG. 6
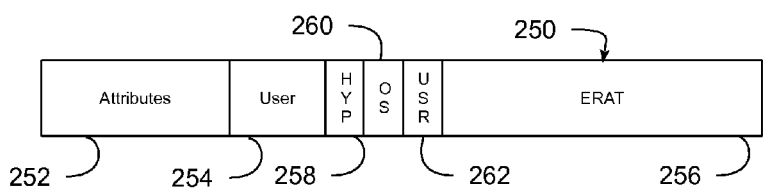
FIG. 7
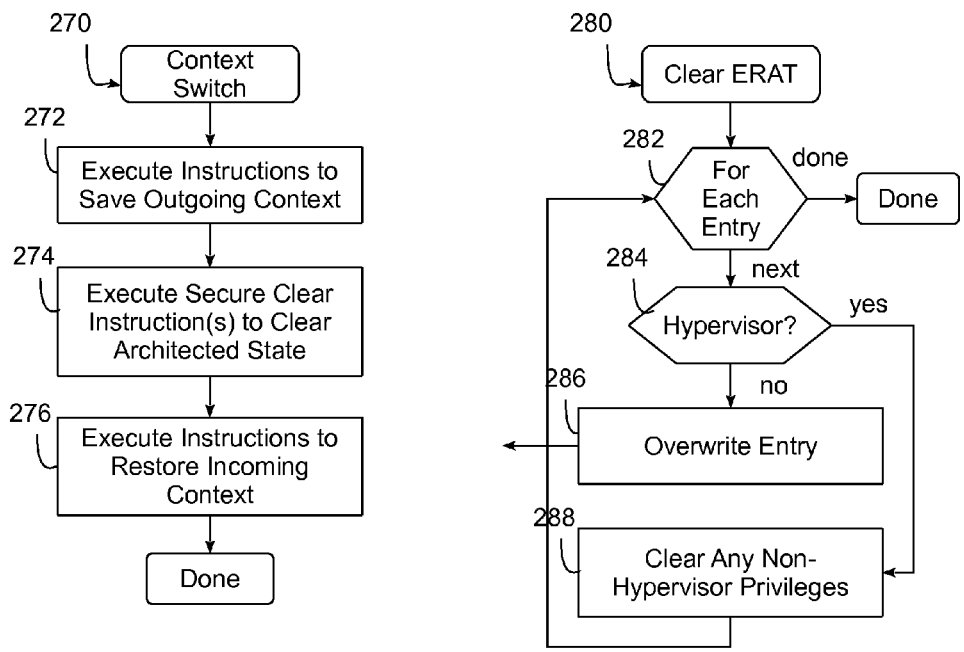
FIG. 8
FIG. 9

INSTRUCTION SET ARCHITECTURE WITH SECURE CLEAR INSTRUCTIONS FOR PROTECTING PROCESSING UNIT ARCHITECTED STATE INFORMATION

CROSS-REFERENCE TO RELATED APPLICATIONS

This application is a continuation of U.S. patent application Ser. No. 13/767,650, filed on Feb. 14, 2013 by Adam J. Muff et al., the entire disclosure of which is incorporated by reference herein.

FIELD OF THE INVENTION

The invention is generally related to data processing, and in particular to instruction set architectures for processors and computers incorporating the same.

BACKGROUND OF THE INVENTION

Protecting secure data stored or used by the processors of a data processing system is of critical importance in many data processing applications. Encryption algorithms are typically applied to secure data to render it unintelligible without application of a decryption algorithm, and secure data is typically stored in mass storage and other non-volatile storage media in an encrypted format, requiring decryption to be performed before the secure data can be read and/or manipulated by a processor in a data processing system. However, in many instances the decryption of encrypted secure data results in the secure data being stored in an unencrypted form in various types of volatile memory in a data processing system, e.g., within a main memory or within various levels of cache memories that are used to accelerate accesses to frequently-used data. Any time that data is stored in an unsecured form in any memory of a data processing system, however, that data may be subject to unauthorized access, potentially compromising the confidential nature of the data.

Encrypting and decrypting data, however, typically requires some amount of processing overhead, and as such, even in applications where secure data is being processed, it is also desirable to retain other, non-secure data in a data processing system so that processing of that other data is not subject to the same processing overhead associated with encryption and decryption.

In addition, as semiconductor technology continues to inch closer to practical limitations in terms of increases in clock speed, architects are increasingly focusing on parallelism in processor architectures to obtain performance improvements. At the chip level, multiple processing cores are often disposed on the same chip, functioning in much the same manner as separate processor chips, or to some extent, as completely separate computers. In addition, even within cores, parallelism is employed through the use of multiple execution units that are specialized to handle certain types of operations. Pipelining is also employed in many instances so that certain operations that may take multiple clock cycles to perform are broken up into stages, enabling other operations to be started prior to completion of earlier operations. Multithreading is also employed to enable multiple instruction streams to be processed in parallel, enabling more overall work to be performed in any given clock cycle.

Due to this increased parallelism, the challenges of maintaining secure data in a data processing system are more significant than in prior, non-parallel data processing systems. In a data processing system that only includes a single processor with a single thread, for example, secure data may be stored in an encrypted form outside of the processor, and decrypted as necessary by that single thread once the data is loaded into the processor. When additional threads, and even additional processing cores are disposed on the same processor chip, however, it may be necessary to limit access to secure data to only certain threads or processing cores on the chip. Thus, for example, if multiple threads or processing cores share a common cache memory, storing any secure data in an unencrypted form in that cache memory may present a risk that an unauthorized party may obtain access to that data via a thread or processing core other than that which is authorized to access the secure data. Furthermore, as modern system on chip (SOC) processor designs grow to hundreds of processing cores on a processor chip, it becomes increasingly important to protect unencrypted data from even other processes on the same processor chip.

Furthermore, even from the standpoint of individual threads in a given processor or processing core, a risk may exist that secure data may be compromised as a result of virtualization. Virtualization may be used at different levels of a data processing system to support the concurrent execution of multiple user processes or applications. A processor hosting a single operating system, for example, may support the concurrent execution of multiple processes in a single operating environment, and may perform context switches to switch between the different processes at relatively frequent intervals such that the multiple processes appear to run in parallel. During a context switch, the internal architected state, or "context," of a processor when executing one process is stored and a previously-stored state for another process is loaded into the processor so that when the processor begins to execute the other process, the internal architected state of the processor is the same as it was when a context switch was made away from that other process.

Likewise, when a processor hosts multiple operating systems within multiple virtual machines or operating environments, a hypervisor may transition between these different virtual operating environments using a process that is similar to a context switch, and as such, the term "context switch" is used hereinafter to include not only context switches performed by an operating system, but also hypervisor-initiated transitions between virtual operating environments, or any other instances where the internal architected state of a processor is temporarily saved and later restored such that program code executing when the internal state of the processor is saved can be resumed when that state is restored as if execution of the program code had never been interrupted.

When a processor transitions between different contexts or virtual machines, however, a risk exists that some data and portions of the architected state may be left behind from a previous context or virtual machine. For example, where a hypervisor controls a data processing system and manages different operating systems running under virtual machines there may be a danger that one operating system could access data or other state information from the previously-executed virtual machine. Conventional cache invalidate instructions, as just one example, invalidate a cache line in a cache by setting an invalidate bit, and otherwise leave the data in the invalidated cache line intact until a new cache line is loaded into the same physical storage. A subsequent operating system could therefore potentially access debug control registers and access the data left in a cache by a prior operating system.

While this risk is generally not a particularly great concern for many applications, in some high security applications the risk that data and/or architected state information associated with one context or virtual machine may be accessed after a context switch precludes the use of some virtualization techniques in those applications. In many government applications, for example, virtual machines may not be permitted as a result of this risk, and it is believed that this risk could be even greater in cloud computing applications where processes owned by completely different entities are virtualized to execute on the same physical hardware.

Therefore, a significant need continues to exist in the art for a manner of securing data and architected state information utilized by multiple processes running on a processor or processing core.

SUMMARY OF THE INVENTION

The invention addresses these and other problems associated with the prior art by providing a method and circuit arrangement that utilize secure clear instructions defined in an instruction set architecture (ISA) for a processing unit to clear, overwrite or otherwise restrict unauthorized access to the internal architected state of the processing unit in association with context switch operations. The secure clear instructions are executable by a hypervisor, operating system, or other supervisory/higher privilege program code in connection with a context switch operation (e.g., from one process, operating system environment or virtual machine to another process, operating system environment or virtual machine), and the processing unit includes security logic that is responsive to such instructions to restrict access by an operating system, process or other lower privilege program code associated with an incoming context to architected state information associated with an operating system or process, or other lower privilege program code associated with an outgoing context.

Therefore, consistent with one aspect of the invention, access to architected state information in a processing unit is restricted by receiving a secure clear instruction in an instruction stream in connection with performing a context switch from an outgoing context to an incoming context, where the secure clear instruction is defined in an instruction set architecture for the processing unit and targets at least one memory element in the processing unit, and in response to receiving the secure clear instruction, decoding and executing the secure clear instruction to perform at least one secure clear operation that restricts access, by program code associated with the incoming context, to data stored in the at least one memory element during execution of program code associated with the outgoing context.

Consistent with another aspect of the invention, a context switch is performed from a first virtual machine to a second virtual machine by, in a hypervisor, causing a plurality of instructions in a context switch routine to be executed by a processing unit to perform a context switch from an outgoing context associated with the first virtual machine to an incoming context associated with the second virtual machine, where the plurality of instructions includes a secure clear instruction defined in an instruction set architecture for the processing unit, wherein the secure clear instruction targets at least one address translation data structure in the processing unit, and, in security logic disposed in the processing unit, and in response to the processing unit receiving the secure clear instruction, restricting virtual machine privilege access to each entry in the address translation data structure while retaining hypervisor privilege access to each entry in the address translation data structure indicating hypervisor privilege.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 6 is a block diagram of an exemplary instruction format for a secure clear instruction in the processing unit of FIG. 5.

FIG. 7 is a block diagram of an exemplary ERAT entry format for the dERAT referenced in FIG. 5.

FIG. 8 is a flowchart illustrating an exemplary sequence of operations for performing a context switch in the processing unit of FIG. 5.

FIG. 9 is a flowchart illustrating an exemplary sequence of operations for clearing an ERAT in the processing unit of FIG. 5.

DETAILED DESCRIPTION

Figure 1:
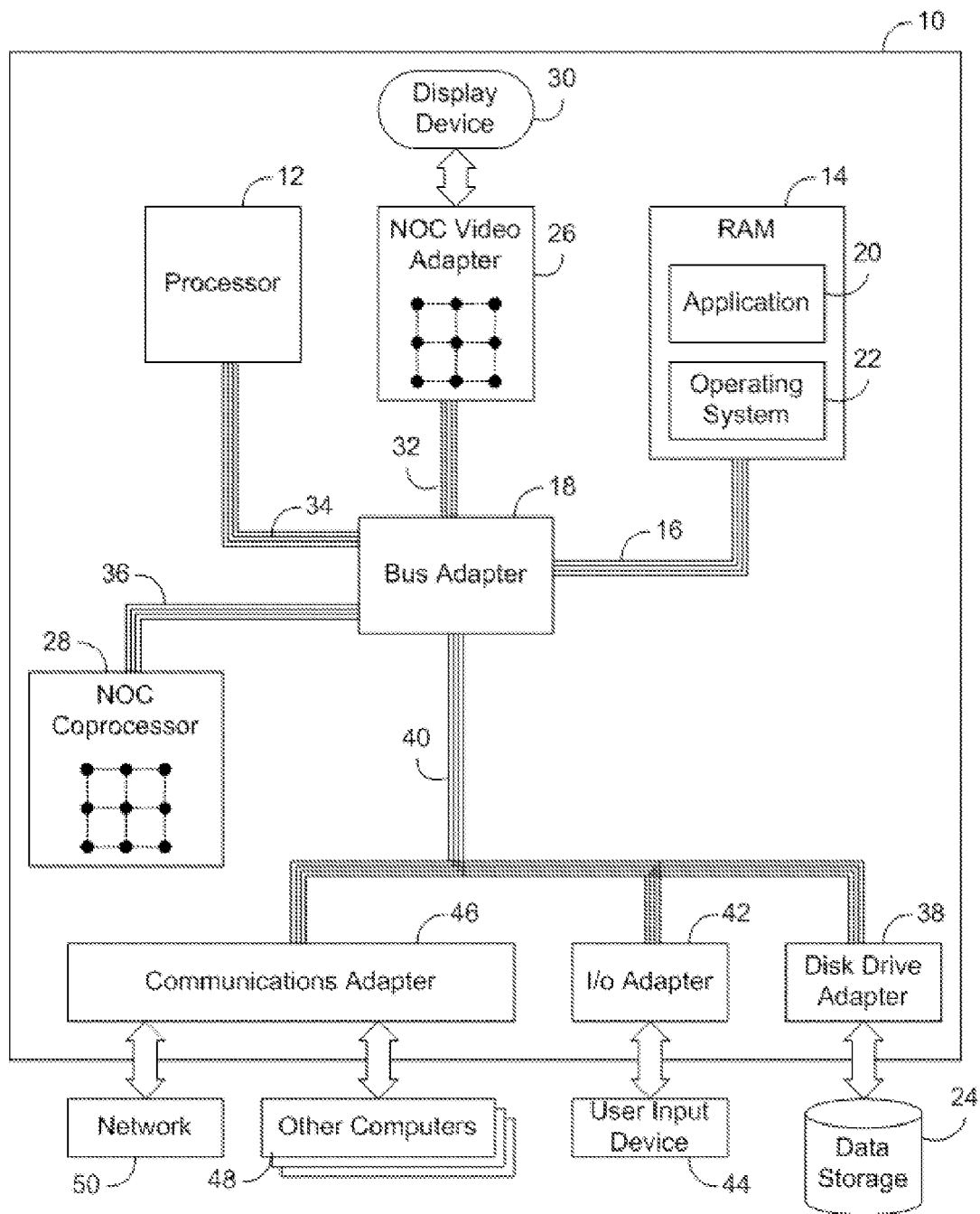
FIG. 1 is a block diagram of exemplary automated computing machinery including an exemplary computer useful in data processing consistent with embodiments of the present invention.

Embodiments consistent with the invention utilize secure clear instructions defined in an instruction set architecture (ISA) to clear, overwrite or otherwise restrict unauthorized access to the internal architected state of a processing unit in association with context switch operations.

A context switch, in this regard, may be considered to include a save and restore operation associated with any of a number of different virtualization techniques where the internal architected state of a processing unit, such as a processor or processor core, is temporarily saved and later restored such that program code executing when the internal state of the processor is saved can be resumed when that state is restored as if execution of the program code had never been interrupted. A context switch may therefore include task swaps and other transitions between processes, e.g., within a single operating system environment, as well as hypervisor-initiated transitions between multiple virtual operating environments, and other instances where transitions that save and restore an internal architected state of a processing unit.

A context represents that portion of the internal architected state of the processing unit that is saved and later restored, which may or may not include all possible architected state information for a processing unit. For the purposes of this disclosure, the context that is associated with an operating system or process that is being temporarily suspended as a result of a context switch is referred to as an "outgoing" context, whereas the context that is associated with an operating system or process that is being resumed as a result of a context switch is referred to as an "incoming" context.

Secure clear instructions consistent with the invention are executable by a hypervisor, operating system, or other supervisory program code in connection with a context switch, and the processing unit includes security logic that is responsive to such instructions to restrict access by an operating system or process associated with an incoming context to architected state information associated with an operating system or process associated with an outgoing context. It will be appreciated that while in many instances architected state information and the information associated with a context may overlap, typically there is some portion of the architected state of a processing unit that is not saved or restored in connection with a context switch, and as such, simply restoring the architected state defined by an incoming context after saving the architected state defined by an outgoing context will typically not overwrite all of the architected state of a processing unit, and as such, secure clear instructions consistent with the invention may be used to restrict access to any residual architected state information that is not typically overwritten when restoring an incoming context.

Other variations and modifications will be apparent to one of ordinary skill in the art. Therefore, the invention is not limited to the specific implementations discussed herein.

Hardware and Software Environment

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™ Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
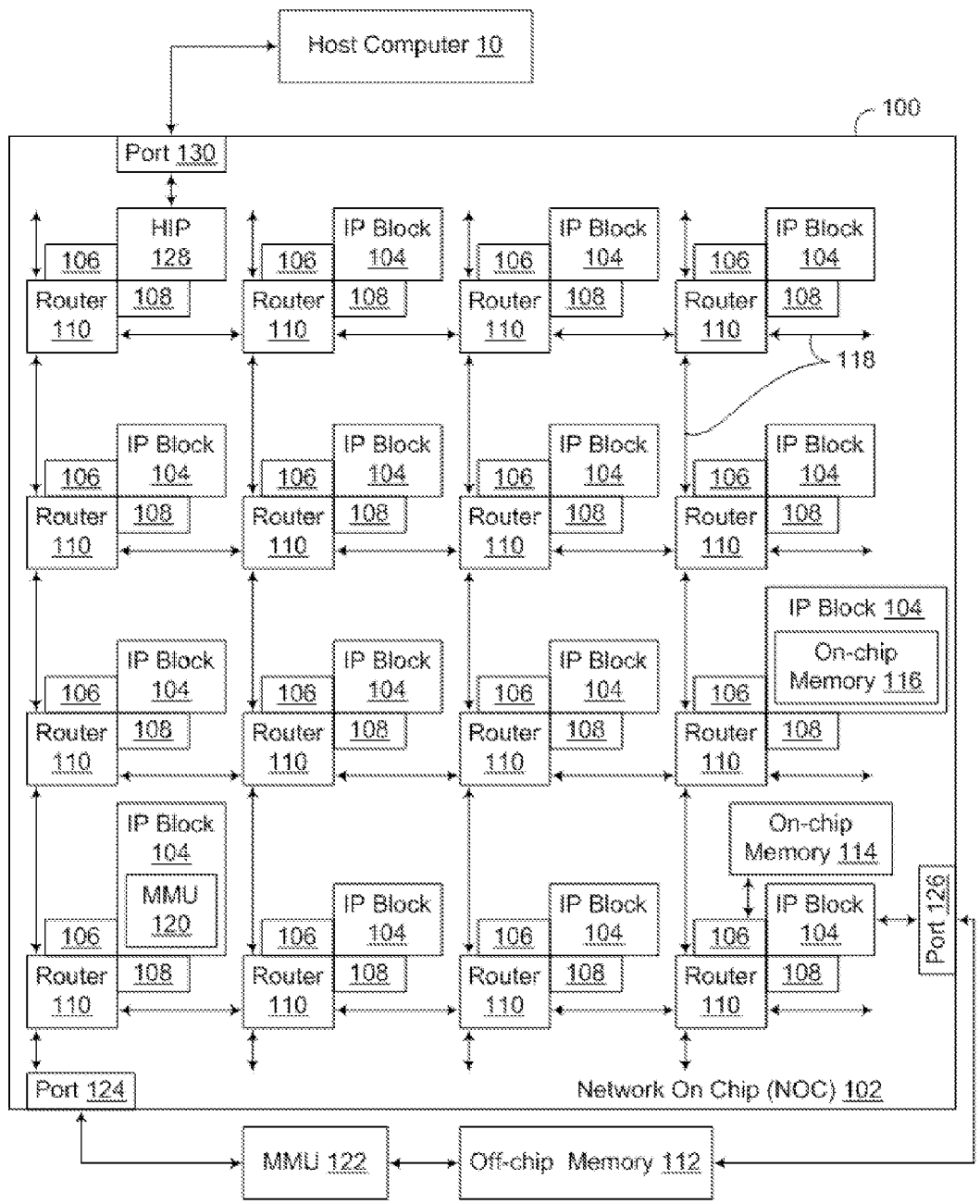
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices, data processing systems utilizing such devices, and other tangible, physical hardware circuits, those of ordinary skill in the art having the benefit of the instant disclosure will appreciate that the invention may also be implemented within a program product, and that the invention applies equally regardless of the particular type of computer readable storage medium being used to distribute the program product. Examples of computer readable storage media include, but are not limited to, physical, recordable type media such as volatile and non-volatile memory devices, floppy disks, hard disk drives, CD-ROMs, and DVDs (among others).

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
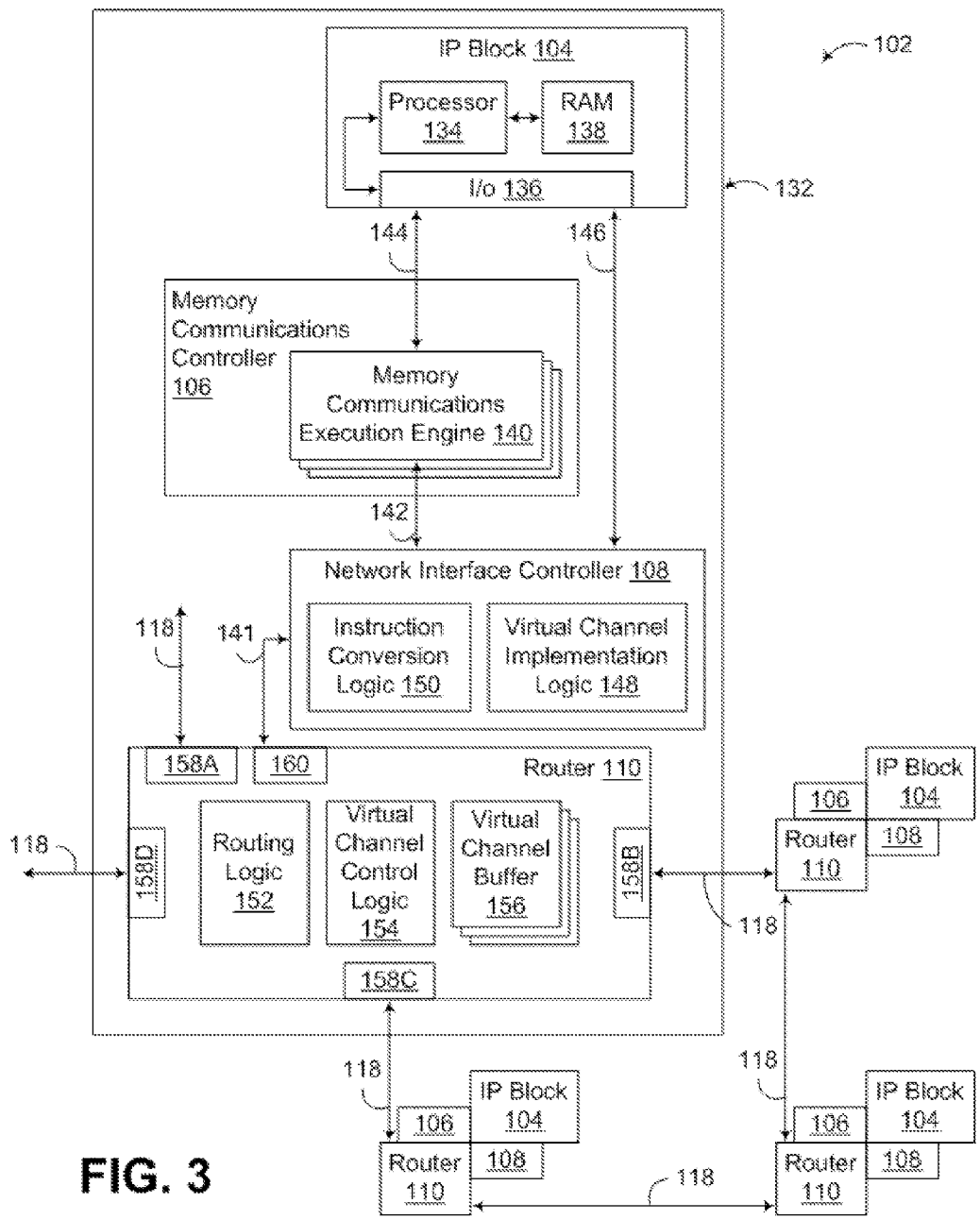
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
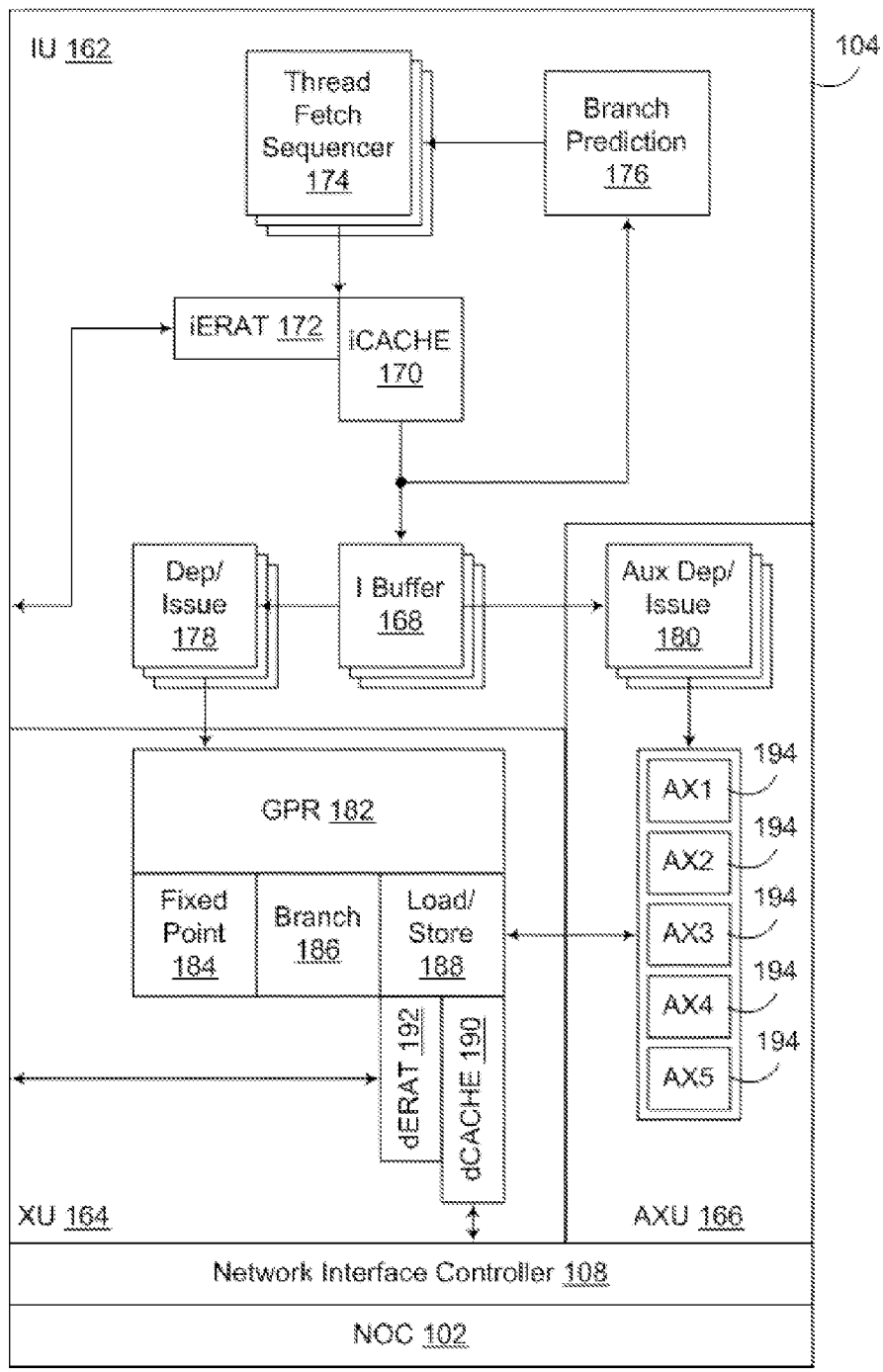
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an issue or instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Secure Clear Instructions

In some data processing systems, security is oftentimes very critical, and as data processing systems are developed with greater numbers of virtual machines running on a single processor or processing core, greater care often needs to be made about what data and architected state may be left behind after a task swap, context switch, or transition to another operating environment (referred to collectively herein as a "context switch"). For example, in the case where a hypervisor controls a data processing system and manages different operating systems running under separate virtual machines, there is a danger that one operating system could access data from a previously-executed operating system. Given that conventional cache invalidate instructions simply invalidate the lines in a cache and leave the data intact, a risk exists that a subsequent operating system could, for example, access debug control registers and access the data left in the caches. It is in part this type of security issue that, for example, often leads to government and other security-conscious systems avoiding the use of virtual machines entirely. Furthermore, this issue could raise an even more dangerous security hole as more and more cloud computing systems are increasingly being used.

Embodiments consistent with the invention, on the other hand, utilize one or more new instructions and associated security logic in a processing unit such as a processor or processor core to enable overwriting of data into various physical processing unit memory elements associated with the internal architected state of the processing unit to reduce the risk of compromising any user's data after a virtual machine swap or other type of context switch.

In some embodiments, for example, an instruction set architecture (ISA) may define a single instruction that may be issued by a hypervisor or operating system to clear a collection of memory elements associated with the architected state of a processing unit, e.g., a processor or processor core. The instruction may be decoded and executed to cause security logic including at least one hardware state machine, sequencer or other control logic in the processing unit to cycle through and write zero's (or other suitable values) to every memory element in each cache, register file, buffer, special purpose register, address translation data structure and pipeline in the processing unit.

In other embodiments, an ISA may define multiple instructions that may be targeted to memory elements in specific components in a processing unit to provide more granular control and support differing levels of security. For example, separate instructions may be defined to clear a cache, a register file, a buffer, a set of special purpose registers, an address translation structure and a pipeline in the processing unit, and in some instances, instructions may be defined that are targeted to groups of such components (e.g., multiple register files, or register files coupled with SPRs), or sub-components within those components (e.g., a cache directory in a cache).

In still other embodiments, an ISA may define additional instructions that target specific entries within a component such as a cache, a cache directory, or an address translation data structure such as an Effective to Real Address Translation (ERAT) unit or Translation Lookaside Buffer (TLB). The targeted entries may be, for example, associated with a particular operating system or process (e.g., clear all ERAT/TLB page table entries (PTEs) associated with a particular process ID), or associated with a particular privilege mode (e.g., clear all non-hypervisor PTEs).

In addition, in some embodiments an ISA may define additional instructions to change the privilege settings of an address translation data structure entry. For example, an instruction may be defined to modify any PTEs in an ERAT/TLB that indicate both hypervisor and guest (operating system) mode privileges to remove guest mode privileges.

In general, an instruction set architecture consistent with the invention may support any number of instructions that are executable by a hypervisor, operating system, or other supervisory program code in connection with a context switch (e.g., from one process or operating system to another process or another operating system) to clear or wipe all or a portion of the internal architected state of a processing unit and thereby restrict access by an operating system or process associated with an incoming context to architected state information associated with an operating system or process associated with an outgoing context.

Figure 5:
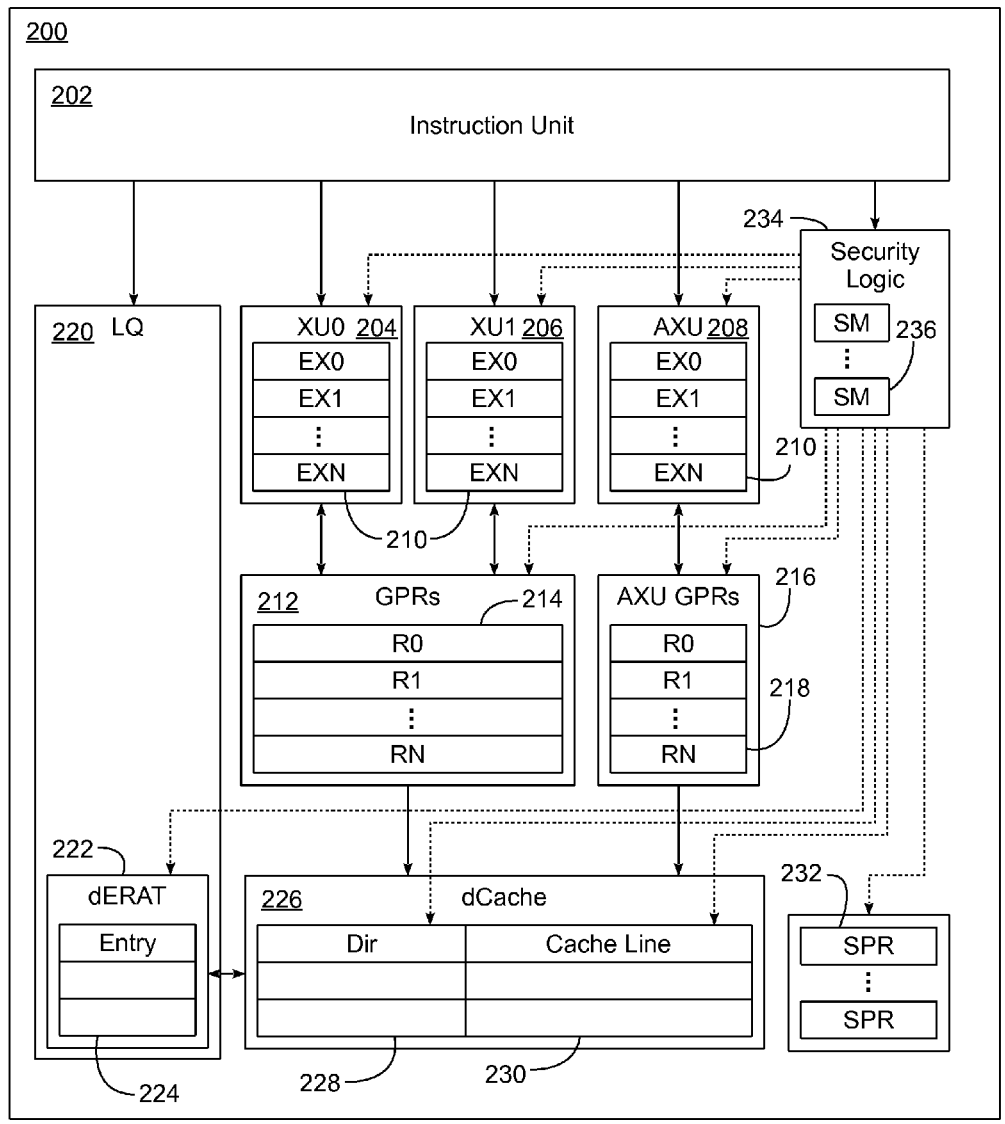
FIG. 5 is a block diagram of an exemplary data processing system with a processing unit capable of decoding and executing secure clear instructions consistent with the invention.

By way of example, FIG. 5 illustrates a data processing system including a portion of an example processing unit 200, which may be implemented, for example, as an IP block from the computer of FIGS. 1-4. Processing unit 200 in general may represent a processor core in a multi-core processor, or a stand-alone processor in other embodiments of the invention.

Processing unit 200 includes an instruction unit 202 configured to decode and issue secure clear instructions consistent with the invention. Instruction unit 202 supplies instructions to one or more execution units, e.g., fixed point execution units 204, 206, which are also designated as XU0 and XU1, and an AXU 208. Each execution unit may be implemented using any type of execution unit, e.g., a scalar or vector fixed point execution unit, a scalar or vector floating point execution unit, or various types of accelerators or specialized execution units (e.g., encryption/decryption engines, DMA engines, compression/decompression engines, physics engines, graphics processors, coprocessors, regular expression engines, XML parsers, etc.). Moreover, multiple instances of an execution type may be supported in a given processing unit design, such that, for example, instructions may be forwarded to different execution units of a given type of execution unit to increase overall throughput. In addition, execution units 204-208 may be pipelined, and thus include a plurality of execution stages 210.

Each execution unit 204-208 typically accesses one or more register files, e.g., a general purpose register file 212 for fixed point execution units 204, 206 including a plurality of general purpose registers (GPRs) 214 and an AXU register file 216 for AXU 208 including a plurality of AXU-specific GPRs 218. Register files may include, for example, fixed point registers, floating point registers, vector registers, etc.

In order to manage the communication of data into and out of processing unit 200, instruction unit 202 is also configured to issue instructions to a load store unit (LQ) 220. In this regard, load store unit 220 includes or is otherwise coupled to a data-specific address translation data structure such as a dERAT 222, which stores or caches a plurality of page table entries (PTEs) 224, and which is further coupled to an L1 data cache (dCache) 226. L1 cache 226 communicates data to and from register files 212, 216, and includes a directory 228 and set of entries 230 for use in storing a plurality of cache lines.

In addition, processing unit 200 typically includes a plurality of special purpose registers 232 that are used to store other architected state information and/or control various configurable operations in the processing unit. Special purpose registers 232 related to the architected state of the processing unit may include, for example, condition registers, guest OS registers, user mode registers, etc.

Processing unit 200 also typically includes additional logic, e.g., instruction-related components such as a branch unit, instruction-specific address translation data structure such as an iERAT, L1 instruction cache (iCache), instruction buffer, decode, rename, dependency/reservation logic, etc., which is not shown in FIG. 5 to simplify the discussion hereinafter. In addition, processing unit 200 may be single- or multi-threaded in various embodiments of the invention. Additional components may also be disposed in processing unit 200 in other embodiments, e.g., additional levels of cache memory (e.g., an L2 and/or an L3 cache), additional address translation data structures (e.g., a Translation Lookaside Buffer (TLB), other execution units, etc.

The aforementioned components collectively store at least a portion of an architected state of the processing unit at any given point in time, and at least a portion of the architected state may include information or data that could potentially be maintained in the processing unit after a context switch to another process or virtual machine, and for which it may be desirable to overwrite or clear to reduce the risk that such data is compromised. As such, processing unit 200 also includes security logic 234, which is configured to receive from instruction unit 202 decoded secure clear instructions from an instruction stream.

Security logic 234 may include, for example, one or more state machines 236 configured to selectively clear or overwrite selected architected state information in the various components in processing unit 200 in response to appropriate secure clear instructions. As illustrated by the dashed lines in FIG. 5, security logic 234 includes control signals to perform the desired clear or overwrite operations. It will be appreciated that the functionality in security logic 234 may be implemented using one or more state machines, sequencers, microcode logic elements, or other suitable logic. Furthermore, while the state machines 236 in security logic 234 are illustrated as being disposed within a single logical component, in some embodiments at least a portion of the logic utilized to overwrite or clear selected components in processing unit 200 may be disposed within or proximate those components. Therefore, the invention is not limited to the particular configuration illustrated in FIG. 5.

Using the aforementioned state machines 236, for example, security logic 234 may initiate a secure clear operation on one or more components in processing unit 200, with the corresponding state machine sequencing through a series of operations to overwrite or clear various memory elements in a particular component in the processing unit. For example, in order to clear the pipeline of execution unit 204, a state machine may be configured to cycle through each stage 210 and overwrite any information stored in the stage with a zero value. Alternatively, each stage may include overwriting logic that permits the latch for that stage to be reset in response to a control signal, such that a state machine may be able to clear the entire pipeline by concurrently providing a single control signal to each stage in the execution unit. Likewise, in order to clear a register file, a state machine may sequence through each register in the register file and store zero values in every register therein, or dedicated logic coupled to each register may be configured to reset the register in response to a control signal such that all registers may be overwritten concurrently. In general, any suitable manner of overwriting any data stored in a latch, register, or other memory element such that any data that was previously in the memory element is no longer accessible may be used to implement a secure clear operation consistent with the invention.

A secure clear instruction consistent with the invention is defined in the instruction set architecture (ISA) for processing unit 200, and may take a number of forms. FIG. 6, for example, illustrates one example instruction format 240, where a secure clear instruction has a primary opcode 242 identifying the instruction as a secure clear instruction. A secondary opcode 244 may also be utilized, e.g., to support different secure clear instructions targeting specific components or classes of components, targeting data for specific users, processes, operating systems, guests, etc., targeting specific types of operations (e.g., clearing or overwriting, or changing privileges). Alternatively no secondary opcode may be provided, and different types of instructions may have different primary opcodes. In still other embodiments only a single secure clear instruction need be supported.

A secure clear instruction may also include a set of component flags 246 that may be used to target particular components or types of components. For example, individual bits may be allocated to clear a pipeline in a specific execution unit, clear the pipelines in a specific type of execution unit (e.g., all fixed point execution units), clear all or specific SPRs, clear the registers in a specific register file, clear an L1 cache, clear an L1 cache directory, and clear an ERAT. In addition, it may be desirable to include an entry mask 248, or alternatively, an entry identifier or entry search parameter that may be used to target specific entries or types of entries in a particular component. For example, it may be desirable to provide a mask that only clears certain cache lines in a cache, certain entries in a cache directory, certain entries in an ERAT, certain registers in a register file, etc. The cache lines/entries/registers may be targeted based on an identifier or based, for example, on privilege or owner (e.g., clear all user-mode entries, clear all guest operating system entries, or clear all entries owned by a particular process ID).

It will be appreciated that different types of secure clear instructions defined in an ISA may have different formats from one another. In addition, it will be appreciated that any of the aforementioned targeting information may be stored in a register such that a secure clear instruction may simply specify one or more registers as operands in order to determine what operation is to be performed in response to the instruction.

As noted above, one type of secure clear operation that may be performed in some embodiments is that of selectively clearing or modifying the privilege of a page table entry to restrict further access to that page table entry and the memory page referenced thereby after a context switch. A page table entry (PTE) is typically stored in an ERAT, TLB or other address translation data structure, and the PTE is associated with a page or other region of memory within which certain data is stored. FIG. 7, for example, illustrates an exemplary PTE 250 capable of being maintained in an ERAT or TLB. PTE 250 typically stores various attributes 252 such as attributes indicating whether a page is cacheable, guarded, or read-only, whether memory coherence or write-through is required, an endian mode bit, etc., and may include additional user mode data 254 used for software coherency or control over cache locking options. An ERAT page attribute 256 stores the effective to real translation data for the PTE, typically including the real address corresponding the effective/virtual address that is used to access the PTE, as well as the effective/virtual address, which is also used to index the ERAT via a CAM function.

One or more access control page attributes, e.g., attributes 258-262, may also be provided to control what entities are permitted to access a page of memory. For example, separate bits 258, 260, 262 may be used to identify a privilege level of the page, with bit 258 set to permit hypervisor access to the page, bit 260 set to permit supervisor or guest operating system access to the page, and bit 262 to permit non-privileged (user) access to the page. Additional access control data, e.g., a process identifier (PID) associated with the process that is authorized to access the page, or optionally a combination of match and/or mask data, or other data suitable for specifying a set of processes that are authorized to access a page of memory, may also be used. For example, the access control attribute may mask off one or more LSBs from a PID so that any PID matching the MSBs in the access control attribute will be permitted to access the corresponding memory page.

It will be appreciated that the format of PTE 230 may be used in multiple address translation data structures, e.g., in an ERAT, a TLB, and any other page table resident in the memory architecture. Alternatively, the PTEs stored in different levels of the memory architecture may include other data or omit some data based upon the needs of that particular level of the memory architecture. Furthermore, it will be appreciated that, while the embodiments discussed herein utilize the terms ERAT and TLB to describe various hardware logic that stores or caches memory address translation information in a processor or processing core, such hardware logic may be referred to by other nomenclature, so the invention is not limited to use with ERATs and TLBs. In addition, other PTE formats may be used and therefore the invention is not limited to the particular PTE format illustrated in FIG. 7.

In operation, the secure clear instructions described herein may be used in connection with a context switch operation, e.g., as performed by a hypervisor, operating system or other supervisory level software entity to switch between contexts associated with particular processes, users, applications, or operating systems. For example, FIG. 8 illustrates a context switch routine 270 that may be executed by a hypervisor to perform a context switch between virtual machines hosting different operating system environments. It will be appreciated that a similar routine may be used, for example, to perform context switches between different processes executing in the same operating system environment.

Routine 270 begins in block 272 by executing instructions from an instruction stream that save an outgoing context, i.e., the architected state of the processing unit while executing a first virtual machine, that, once restored, enables the virtual machine to continue with execution at the point at which the context switch occurred. Next, block 274 executes one or more secure clear instructions to clear all or a portion of the architected state of the processing unit by overwriting various memory elements within which may be stored data that could potentially be accessed after the context switch. Next, block 276 executes instructions from the instruction stream to restore an incoming context, thereby restoring the architected state of the processing unit such that a second, previously-suspended virtual machine can resume execution.

Given that restoring the context may not overwrite all of the architected state of the processing unit (e.g., cache directories, cache lines, registers, and/or pipelines may not always be restored in connection with a context switch), the execution of the secure clear instructions ensures that when the second virtual machine resumes execution, any secure data associated with the first virtual machine is not accessible by the second virtual machine. As such, the secure clear instructions enhance and support the security of the first virtual machine after the context switch.

As noted above, one type of secure clear operation that may be supported in some embodiments is that of selectively clearing PTEs to inhibit unauthorized use of such entries. In particular, it may be desirable in some embodiments to utilize a secure clear instruction that targets an ERAT or other address translation data structure, and that causes lower privilege rights for entries in the ERAT to be effectively removed such that program code executing in an incoming context is unable to use any entries that were previously used by program code executing in an outgoing context. Further, higher privilege rights may be retained to entries in the ERAT such that higher privilege program code, e.g., a hypervisor or operating system, may continue to use existing entries in the ERAT. The removal of lower privilege rights may include, in some instances, simply overwriting or clearing entries that do not indicate a higher privilege. In other instances, e.g., where both higher and lower privilege rights are indicated for a particular entry, the lower privilege rights may be removed while retaining both the entry and the higher privilege rights such that higher privilege program code may continue to utilize the entry.

FIG. 9, for example, illustrates a clear ERAT routine 280 that may be implemented by security logic 234 of FIG. 5 to protect data in an ERAT, and in memory pages accessed through an ERAT, from unauthorized access. Routine 280 sequences through each entry in the ERAT in block 282, and for each such entry, block 284 determines whether the entry indicates a hypervisor-level privilege. If not, control passes to block 286 to overwrite the entry, e.g., by invalidating the entry and writing a zero value to the entry. Control then returns to block 282 to process additional entries.

If an entry does indicate hypervisor-level privilege, block 284 instead passes control to block 288 to clear or reset any non-hypervisor privileges, while retaining hypervisor rights to the entry. Thus, for example, if an entry indicates both hypervisor and operating system privileges, the rights of the operating system may be effectively revoked such that only the hypervisor has rights to access the entry after the context switch. Control then returns to block 282 to process all remaining entries.

By clearing non-hypervisor entries and/or removing non-hypervisor rights to hypervisor entries, an ERAT may be effectively cleared to protect any secure data associated with a particular virtual machine or operating system environment, but without clearing any entries that may be required by or useful for the hypervisor to run.

It will be appreciated that similar routines may be implemented to target, for example, only certain cache lines and/or directory entries in a cache (e.g., only those entries associated with a particular virtual machine or operating system environment), or to target only certain registers in a register file (e.g., only those registers used by a particular virtual machine or operating system). Furthermore, through combining various types of secure clear instructions, a hypervisor may be able to implement various levels of security for different applications, and, for example, balance any adverse performance impact of secure clear instructions with the level of security desired for a particular application.

The disclosed invention therefore allows a hypervisor or other supervisory level software to protect secure data associated with the internal architected state of a processing unit in connection with context switches and similar operations, and in various applications where a processing unit is used to virtualize the workloads of multiple unrelated entities.

Various additional modifications may be made to the disclosed embodiments without departing from the spirit and scope of the invention. Therefore, the invention lies in the claims hereinafter appended.

What is claimed is:

1. A circuit arrangement, comprising:
    a processing unit including a plurality of hardware components including a plurality of memory elements collectively storing an architected state for the processing unit;
    security logic disposed in the processing unit and configured to perform at least one secure clear operation that restricts access to data stored in at least a subset of the plurality of memory elements; and
    an instruction unit disposed in the processing unit and configured to decode instructions from at least one instruction stream and associated with an instruction set architecture, wherein the instruction set architecture defines a secure clear instruction that targets at least one memory element in the processing unit, and wherein the instruction unit is configured to, in response to receiving the secure clear instruction in an instruction stream in connection with performing a context switch from an outgoing context to an incoming context, decode the secure clear instruction and cause the security logic to perform the secure clear operation to restrict access, by program code associated with the incoming context, to data stored in the at least one memory element during execution of program code associated with the outgoing context, wherein the at least one memory element stores residual internal architected state information of the processing unit for the outgoing context that is not overwritten when restoring the incoming context, wherein the secure clear operation restricts access by the program code to the residual internal architected state information of the processing unit for the outgoing context, wherein the secure clear instruction is associated with program code having a first privilege, and wherein the secure clear operation is configured to clear an address translation data structure by overwriting any entries in the address translation data structure not associated with the first privilege.

2. The circuit arrangement of claim 1, wherein the secure clear instruction targets the at least one memory element by specifying a component or component type with which the memory element is associated, wherein the component is selected from the group consisting of a cache, a cache directory, an address translation data structure, a register, a register file, an execution unit, a pipeline, a pipeline stage, and a special purpose register.

3. The circuit arrangement of claim 1, wherein the secure clear instruction is a first secure clear instruction, wherein the instruction unit is configured to, in response to receiving a second secure clear instruction in an instruction stream, cause the security logic to perform a second secure clear operation, and wherein the second secure clear operation is configured to clear the address translation data structure by removing any lower privileges from entries in the address translation data structure that are associated with the first privilege.

4. The circuit arrangement of claim 1, wherein the secure clear instruction is executed by a hypervisor, and wherein the incoming and outgoing contexts are respectively associated with incoming and outgoing virtual machines hosted by the hypervisor.

5. An integrated circuit device comprising:
a processing unit including a plurality of hardware components including a plurality of memory elements collectively storing an architected state for the processing unit;
security logic disposed in the processing unit and configured to perform at least one secure clear operation that restricts access to data stored in at least a subset of the plurality of memory elements; and
an instruction unit disposed in the processing unit and configured to decode instructions from at least one instruction stream and associated with an instruction set architecture, wherein the instruction set architecture defines a secure clear instruction that targets at least one memory element in the processing unit, and wherein the instruction unit is configured to, in response to receiving the secure clear instruction in an instruction stream in connection with performing a context switch from an outgoing context to an incoming context, decode the secure clear instruction and cause the security logic to perform the secure clear operation to restrict access, by program code associated with the incoming context, to data stored in the at least one memory element during execution of program code associated with the outgoing context, wherein the at least one memory element stores residual internal architected state information of the processing unit for the outgoing context that is not overwritten when restoring the incoming context, wherein the secure clear operation restricts access by the program code to the residual internal architected state information of the processing unit for the outgoing context, wherein the secure clear instruction is associated with program code having a first privilege, and wherein the secure clear operation is configured to clear an address translation data structure by overwriting any entries in the address translation data structure not associated with the first privilege.

6. The integrated circuit device of claim 5, wherein the secure clear instruction targets the at least one memory element by specifying a component or component type with which the memory element is associated, wherein the component is selected from the group consisting of a cache, a cache directory, an address translation data structure, a register, a register file, an execution unit, a pipeline, a pipeline stage, and a special purpose register.

7. The integrated circuit device of claim 5, wherein the secure clear instruction is a first secure clear instruction, wherein the instruction unit is configured to, in response to receiving a second secure clear instruction in an instruction stream, cause the security logic to perform a second secure clear operation, and wherein the second secure clear operation is configured to clear the address translation data structure by removing any lower privileges from entries in the address translation data structure that are associated with the first privilege.

8. The integrated circuit device of claim 5, wherein the secure clear instruction is executed by a hypervisor, and wherein the incoming and outgoing contexts are respectively associated with incoming and outgoing virtual machines hosted by the hypervisor.

9. An integrated circuit device comprising:
a processing unit including a plurality of hardware components including a plurality of memory elements collectively storing an architected state for the processing unit;
security logic disposed in the processing unit and configured to perform at least one secure clear operation that restricts access to data stored in at least a subset of the plurality of memory elements; and
an instruction unit disposed in the processing unit and configured to decode instructions from at least one instruction stream and associated with an instruction set architecture, wherein the instruction set architecture defines a secure clear instruction that targets at least one memory element in the processing unit, and wherein the instruction unit is configured to, in response to receiving the secure clear instruction in an instruction stream in connection with performing a context switch from an outgoing context to an incoming context, decode the secure clear instruction and cause the security logic to perform the secure clear operation to restrict access, by program code associated with the incoming context, to data stored in the at least one memory element during execution of program code associated with the outgoing context, wherein the at least one memory element stores residual internal architected state information of the processing unit for the outgoing context that is not overwritten when restoring the incoming context, wherein the secure clear operation restricts access by the program code to the residual internal architected state information of the processing unit for the outgoing context, wherein the secure clear instruction is associated with program code having a first privilege, and wherein the secure clear operation is configured to clear an address translation data structure by removing any lower privileges from entries in the address translation data structure that are associated with the first privilege.

10. The integrated circuit device of claim 9, wherein the secure clear instruction targets the at least one memory element by specifying a component or component type with which the memory element is associated, wherein the component is selected from the group consisting of a cache, a cache directory, an address translation data structure, a register, a register file, an execution unit, a pipeline, a pipeline stage, and a special purpose register.

11. The integrated circuit device of claim 9, wherein the secure clear instruction is a first secure clear instruction, wherein the instruction unit is configured to, in response to receiving a second secure clear instruction in an instruction stream, cause the security logic to perform a second secure clear operation, and wherein the second secure clear operation is configured to clear the address translation data structure by overwriting any entries in the address translation data structure not associated with the first privilege.

12. The integrated circuit device of claim 9, wherein the secure clear instruction is executed by a hypervisor, and wherein the incoming and outgoing contexts are respectively associated with incoming and outgoing virtual machines hosted by the hypervisor.

* * * * *